United States Patent [19]
Green

[11] 3,778,928
[45] Dec. 18, 1973

[54] PLANTER IRRIGATION SYSTEM WITH SAND DRAIN

[76] Inventor: Evert S. Green, 14 Kenneth Ave., North Bellmore, N.Y.

[22] Filed: May 7, 1971

[21] Appl. No.: 141,113

Related U.S. Application Data

[63] Continuation-in-part of Ser. No. 10,147, Feb. 10, 1970, abandoned.

[52] U.S. Cl. .............................. 47/38.1, 137/390
[51] Int. Cl. ........................................ A01g 27/00
[58] Field of Search ............... 47/38, 38.1, 48.5, 47/1.2; 137/390

[56] References Cited
UNITED STATES PATENTS

| | | | |
|---|---|---|---|
| 2,818,877 | 1/1958 | Swanson | 47/38.1 X |
| 2,880,549 | 4/1959 | Knipe | 47/38.1 |
| 2,051,461 | 8/1936 | Lee | 47/38.1 X |
| 473,756 | 4/1892 | Jones | 47/38.1 |
| 1,222,648 | 4/1917 | Marks | 47/38.1 |
| 3,220,144 | 11/1965 | Green | 47/38.1 |
| 2,038,019 | 4/1936 | Wright | 47/38 |
| 2,191,700 | 2/1940 | Stetson | 137/390 |
| 2,815,289 | 12/1957 | Murray | 137/390 |
| 1,989,403 | 1/1935 | Dauernheim | 47/38.1 |
| 3,106,043 | 10/1963 | Ferrand | 47/38 |
| 3,193,970 | 7/1965 | Green | 47/38.1 |

Primary Examiner—Robert E. Pulfrey
Assistant Examiner—Eugene H. Eickholt
Attorney—Kenyon & Kenyon Reilly Carr & Chapin

[57] ABSTRACT

Apparatus for supplying water to and removing water from a plurality of plants in accordance with the needs of each individual plant is disclosed. The apparatus includes a water reservoir which by capillary action continuously circulates water through a drain controlled water transmitting agent. The plants are placed on the water transmitting agent and by capillary action can receive as much water as they require from the water in the transmitting agent discharging their dissolved waste products to the transmitting agent where they are carried to the drain mechanism away from the plants themselves.

4 Claims, 13 Drawing Figures

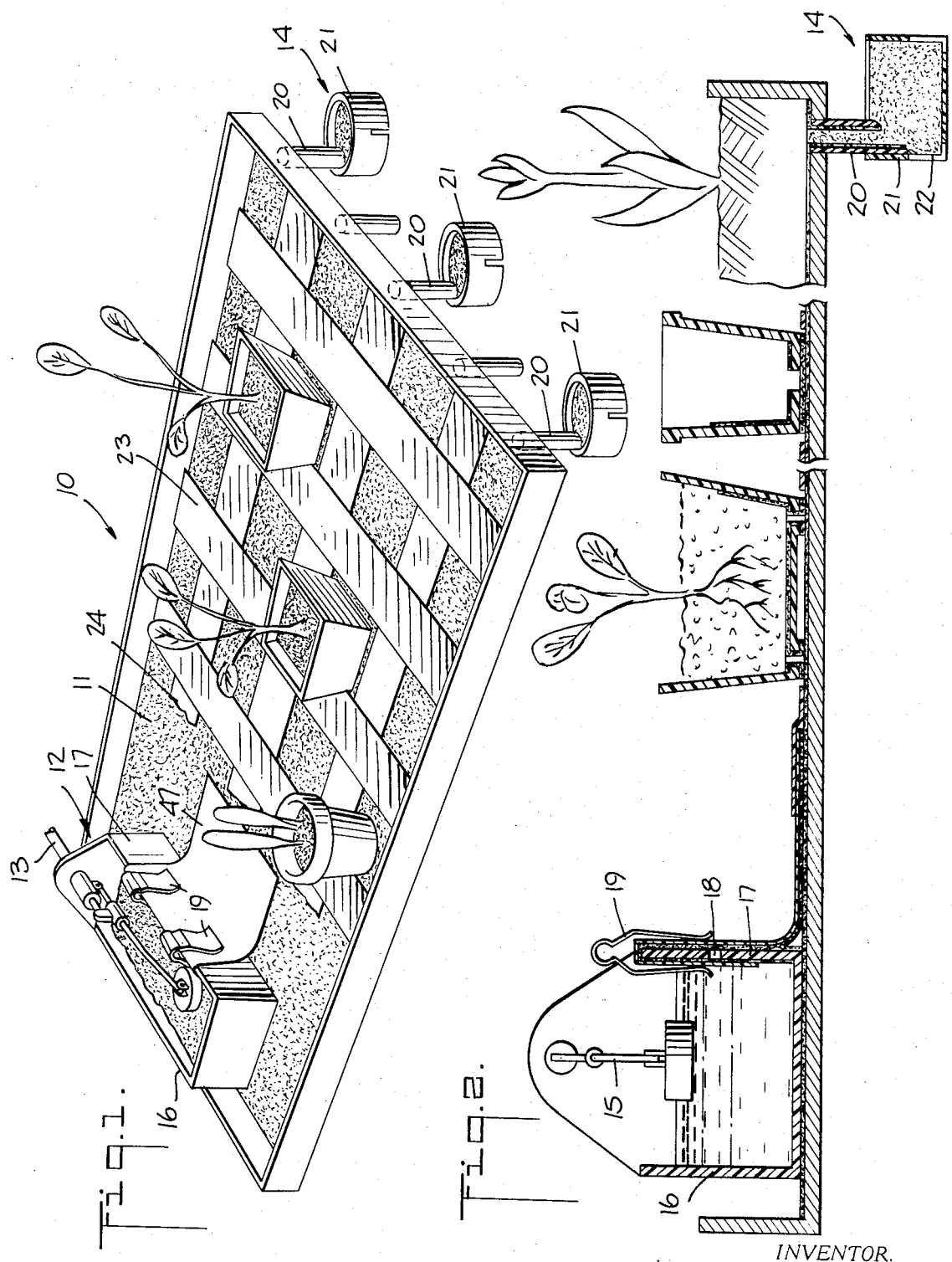

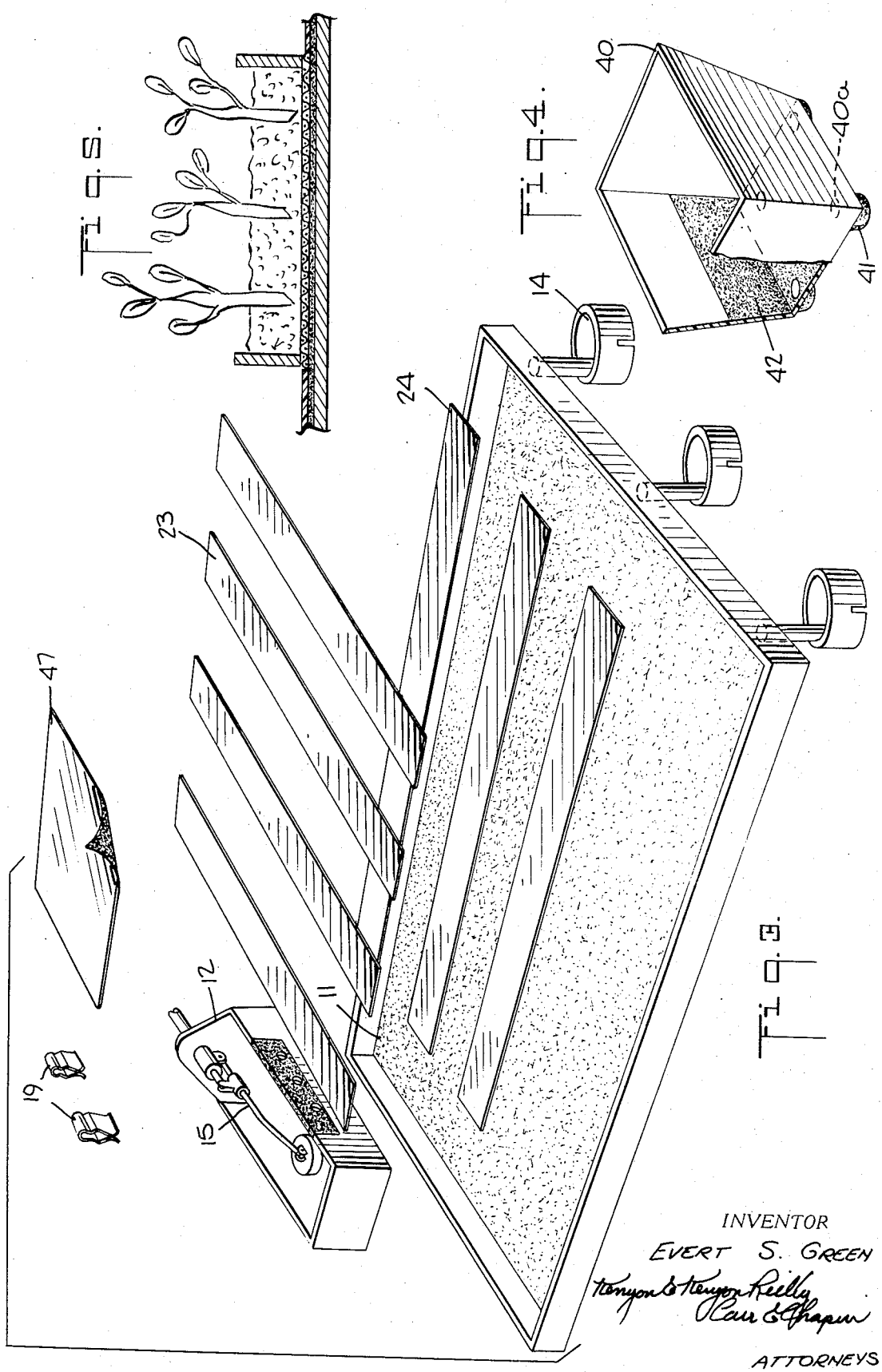

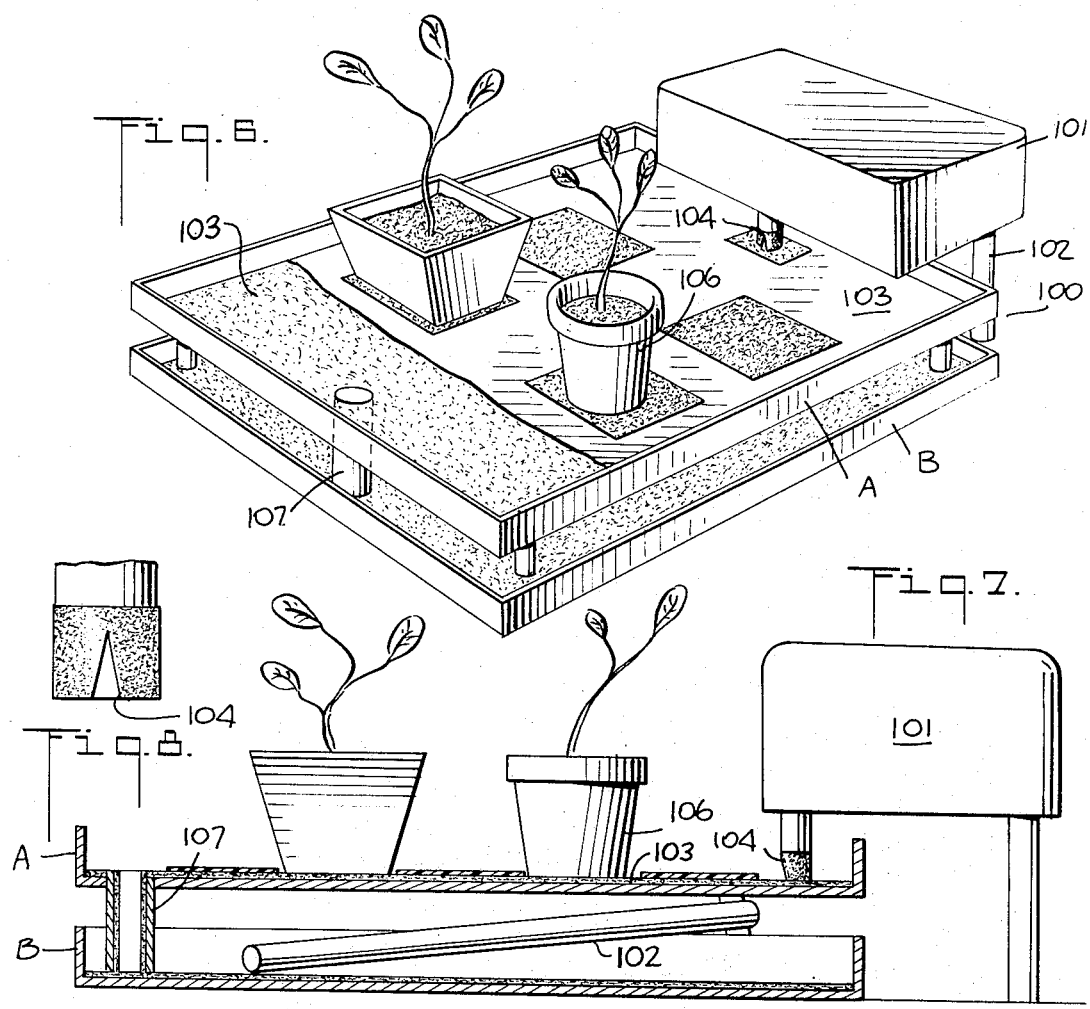

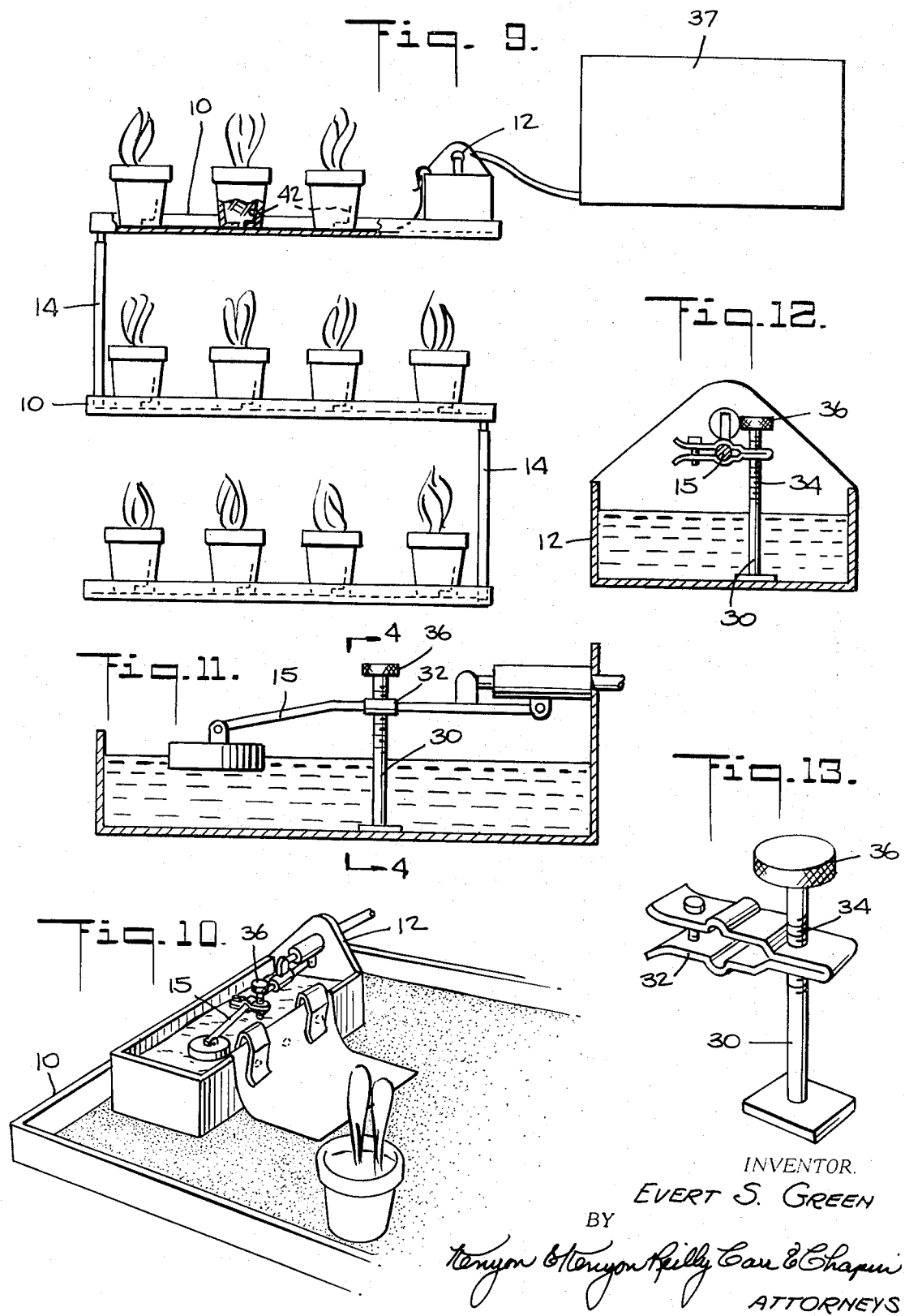

PLANTER IRRIGATION SYSTEM WITH SAND DRAIN

CROSS-REFERENCE TO RELATED APPLICATIONS

This application is a continuation-in-part of my earlier application Ser. No. 10,147, now abandoned, filed Feb. 10, 1970 for "Planter Irrigation System."

BACKGROUND OF THE INVENTION

This invention relates to apparatus for controlling the amount of water that is supplied to one or more plants in accordance with the requirements of each individual plant.

It is generally believed there is a particular moisture environment for plants that will insure optimum growth of the plants. Too little water will not allow the plant to grow as the plant requires water to aid in photosynthesis and its other metabolic processes. Similarly, too much water will not allow the plant to properly grow as an overabundance of water in the soil surrounding the plant roots will reduce the amount of air in the soil; the air being required by the plant in combination with the proper amount of water for operation of the plant's metabolism. In addition to maintaining the proper moisture content in the plant, it is desirable to maintain a continuous flow of water to the plant along with the continuous removal of water from the plant in accordance with the plant's needs. An adequate and continuous supply of water to the plant insures proper plant growth and if the water that is being supplied to the plant includes a nutrient and/or chemical, continuous flow of water to the plant insures that the nutrient and/or chemical will be continually supplied to the plant. The continuous removal of the water from the plant insures that the waste products of the plant are removed from the vicinity of the plant thus preventing water immediately about the plant from becoming stagnant.

The water that is supplied to a plant and that is in the vicinity of the roots of the plant is known as capillary water. Capillary water is held loosely in the soil and as the roots absorb water, the capillary water is drawn by capillary action from moisture particles of the soil to the drier particles of soil immediately adjacent the plant roots. This cycle repeats itself as the plant roots absorb water from the soil immediately adjacent the roots.

Plants are capable of regulating the amount of water they require for optimum growth when they are allowed to selectively choose the amount of water they will utilize. Of course, merely by placing the plant in a reservoir of water will not allow the plant to regulate the amount of water to be supplied to it to insure optimum growth. The water in a standard earthenware flower pot is transferred to the plant through the earthenware walls of the flower pot and through a central opening in the bottom of the flower pot. In this type of flower pot is it rare for water to reach the interior of a pot as usually the soil adjacent the inside walls of the flower pot and adjacent the central opening of the flower pot are the only areas that are moist. Additionally, in a standard flower pot there is no provision for a continuous circulation of water to and from the plant. Thus, with a standard flower pot arrangement it is difficult to continuously feed nutrients and/or chemicals to the plant since there is no continual circulation of water to the plant. Similarly, as there is no removal of water from the plant, the waste products remain with the plant, inhibiting to a certain extent, the growth of the plant. Other self-watering devices such as wicks, etc., suffer from not being able to circulate water to the plant or being able to insure that the soil adjacent the roots of the plant is moist so it can feed the plant through the roots of the plant.

In my U.S. Pat. No. 3,220,144 for a Planter, filed on Mar. 6, 1964, and issued on Nov. 30, 1965, I disclose apparatus to continually circulate water to a single plant. While this patent discloses apparatus to adequately circulate water to a plant in accordance with the plant's needs, it is designed for use with only one plant. Similarly, in my U.S. Pat. No. 3,193,970 for a Plant Container, filed on July 2, 1963 and issued on July 13, 1965, I disclose apparatus that will allow a plant to regulate the amount of water that will be circulated through its container in accordance with the needs of the plant.

While both of my above-identified patents disclose apparatus for allowing a single plant to regulate the amount of water circulated in its container, neither patent discloses apparatus to allow a plurality of plants, as would be found in a hot-house, florist shop, or in a home wherein a lot of plants are kept, to be stored in one structure with each plant regulating the amount of water supplied to it and removed from it. While the systems described in my earlier patents were inadequate to supply water to several planters and plant containers the structure in these embodiments did provide control for the amount of water that the plant could absorb. In hothouses where temperature variation is a problem and it is necessary to properly water a plurality of plants, it would not be economically feasible to use the structure of either of my U.S. patents as the apparatus of each of these patents is designed for use with a single plant.

It is therefore an object of the present invention to provide apparatus that can supply water to a plurality of individual plants and remove water from the plants in accordance with the needs of each individual plant.

A further object of the present invention is to provide apparatus that will provide optimum moisture conditions for each of a plurality of plants in accordance with the individual requirements of each plant.

Another object of the present invention is to provide economical and reliable apparatus to achieve each of the foregoing objects.

BRIEF SUMMARY OF THE INVENTION

Briefly, in accordance with the present invention, the foregoing and other objects are accomplished by placing a reservoir of water in communication with a water transmitting agent, such as a sand glazed plastic strip. A drain mechanism is communicated to the water transmitting agent and the draining therefrom causes a continuous flow of water from the water reservoir by capillary action along the water transmitting agent to the drain mechanism. Plant modules, or the plants themselves, may be placed on the water transmitting agent to absorb by capillary action water they need from the moisture in the water transmitting agent and to discharge thereto their dissolved waste products which are removed from the vicinity of the plants by the continuous circulation of water on the water transmitting agent.

BRIEF DESCRIPTION OF THE DRAWINGS

Other objects, aspects and features of the present invention will be apparent from the foregoing description and drawings in which:

FIG. 1 is a perspective illustration of one embodiment of the present invention;

FIG. 2 is a view along lines 2—2 of FIG. 1 illustrating how plants are grown in planters, and in soil or soil-less mix;

FIG. 3 is an exploded view of the invention shown in FIG. 2;

FIG. 4 illustrates a plant container that may be used in the present invention;

FIG. 5 illustrates how plant cuttings are propagated in sand, soil, and soil-less mix;

FIG. 6 is a perspective view of a second embodiment of the present invention;

FIG. 7 is a cutaway view of FIG. 6;

FIG. 8 is an enlarged view of the discharge spout that is utilized when the water regulator of the FIG. 6 embodiment is used;

FIG. 9 is a perspective view of a series of trays in accordance with this invention assembled in a vertically cascaded configuration; and FIG. 10 is a perspective view of a specific float regulating apparatus of this invention.

FIG. 11 is a sectional elevation view of the float regulator of this invention;

FIG. 12 is an end section view of the float regulator of this invention;

FIG. 13 is a perspective view of a float adjustment pin of this invention.

DESCRIPTION OF THE PREFERRED EMBODIMENT

Referring now to the drawings, and more particularly to FIGS. 1, 2 and 3 wherein a planter in accordance with the present invention is seen to include a rectangular tray 10 having a bottom upon which is located a sand glazed plastic element 11. The sand is glazed onto the plastic so that water can be transmitted thereacross as will be apparent to those skilled in the art. Located adjacent one end of tray 10 is a water regulating mechanism 12 which receives water from a conduit 13 and includes end walls 17 and 16. A float valve arrangement 15 is located within the reservoir and controls the amount of water that is directed into the reservoir from conduit 13 in accordance with the height of the water therein. An aperture, or preferably a series of apertures, 18 are located in wall 17 and a clip 19 is utilized to clip a plastic water transmitting film 40 over wall 17 so that the water in the reservoir may be transmitted through the film 47 to sand glazed film 11. A drain mechanism 14 is located at the end of the planter furthest away from the water regulating mechanism and includes a series of caps 21 which communicate with the sand glazed film 11 via a conduit 20. Caps 21 include slits 22 about their peripheries and are filled with sand so that the water therein will evaporate through the slits.

A series of plastic strips 23 and 24 are located on a crisscross fashion along sand glazed film 11 with the spaces between the strips being adapted to receive planter and plant containers 40, the purpose of the plastic strips being to prevent evaporation from the sand glazed film 11. Plant containers and planter 40 include apertures 40a into which feed tube 26 of U.S. Pat. No. 3,220,144 is inserted for internal irrigation of the planter. A sand glazed strip 42 may be located in the container to assist in transmitting the water from film 11 to and/or from the soil within the container.

In normal operation water within reservoir 12 is conducted via film 47 onto sand glazed film 11 and as a result of the drainage in drain caps 14 passed through and along film 11. Containers may be placed on the film in the areas not occupied by the plastic strips with the water being directed through the openings in the bottom of the container and the sand glazed material 42 within the container (as shown in FIG. 4) to the interior of the container and the soil adjacent the plant and ultimately to the plant. The amount of water that will be directed to the plant will depend upon the requirements of the plant and the plant will also discharge its waste products to the continuously circulating water on film 11 which will be transferred to drain 14. As a result there will be no stagnation about the plants contained in planter 10.

It should be emphasized that this system is capable of irrigating the plants themselves according to the needs of each individual plant. The invention of this application is not merely a device for distributing water in some predetermined constant fashion to a number of containers, but actually irrigates each plant according to its needs. This function is made possible, as explained above, by sand glazed element 11 in the bottom of the tray and by sand glazed material 42 included on the inside of each pot. These sand glazed elements cooperate to draw water into each pot in accordance with the demands of the plant therein contained. Furthermore, the water circulating through each pot serves to remove waste materials given off by the plant.

It can be seen that the addition of the sand glazed material 42 to the interior of a pot converts such a pot when used in conjunction with the disposable tray having element 11, into a custom plant irrigator.

Applicant has discovered that the previously disclosed sand glazed strip 39 serves the dual purpose of providing a plant in a pot or planter containing strip 39 with an adequate supply of water, and also removing respiration water and waste products from the vicinity of the plant. As can be seen in FIG. 4, the sand glazed strip is positioned adjacent the wall of the pot or plant container, with the sanded side facing away from the wall, i.e., inwardly in the pot.

As is also illustrated in FIG. 4, the pot is provided with protrusions 41a which communicate with sand glazed material 39. When the container is placed with these protrusions in contact with water, water is drawn up the sanded side of strip 39 to the vicinity of the plant roots. The plant root hairs absorb this incoming fresh water by osmosis. The plant itself determines how much water it absorbs, and consequently determines the amount of water which passes upwardly over the sanded side of strip 39.

The plant's normal metabolism involves the release of respiration water from the roots thereof, and also soluble waste products. This respiration water is not useful for the further metabolism of the plant, unless it is mixed with incoming fresh water. Alternately, it should be removed from the vicinity of the plant.

Applicant has found that the respiration water and waste products tend to be returned to the vicinity of sand glazed strip 39. When this occurs, some of this respiration water becomes mixed with fresh water coming up the sanded side of the strip. It should be noted, that, in the common flower pot with a hole in the bottom, the placement of such a pot in a reservoir of water results in excessive quantities of water being absorbed upwardly into the pot through the soil, followed by a stagnation of that water within the pot, due to the extreme limitations on the capability of such a pot to remove respiration waters and waste products from the vicinity of the plant roots.

It is notable that, where a plant irrigation system is made up of a number of trays 10, stacked vertically, as in FIG. 10, wherein water from a source enters the top tray and cascades through drain 14 successively downward through the lower trays, a considerable pressure drop from top to bottom trays occurs, such that water is copiously drawn by gravity and capillary action from the source. This necessitates that large volumes of water must be supplied to the system, in order that integrity of the capillary action be preserved. If water is drawn from the reservoir faster than it can be replaced by the source, the capillary action between trays will be broken.

If an unlimited supply of water at high pressure is available, this condition poses no problem, unless the water flow rate necessary to maintain capillary attraction is so great as to be harmful to the plants.

However, if the water supply is limited, as in the case where a tank 37 having limited volume is the water source for the reservoir, the excessive water drain will cause float 15 to drop as the reservoir is depleted. If the tank cannot fill the reservoir at the same rate as the system draws water from the reservoir, the tank will soon become empty, causing a break in the capillary action, if such has not already occurred due to the differential of flow rates into and out of the reservoir.

Thus, it is desirable to maintain some water in the reservoir as long as possible, while assuring simultaneously that the float, which would normally fall to a point allowing full input flow with the rapid withdrawal of water by the cascaded trays, is prevented from doing so, so that the tank is not exhausted too rapidly.

This can be accomplished by an apparatus which compromises the amount of input to the reservoir, by permitting a preset input at all times, thus maintaining some water in the reservoir, supporting capillary action, while not allowing full flow, which would draw too much water, depleting the tank too rapidly.

The desired regulation of water input to the reservoir is accomplished by means of the apparatus shown in FIG. 10. This apparatus includes a vertical spindle 30 rotatably anchored to the bottom of reservoir 12. Spindle 30 bears threads 34 along a portion of its length. Spring clip 32 is adapted to be screwed onto the spindle 30 and is also adapted to engage and hold fixed the arm of float regulator 15. The height of spring clip 32, and hence the height of float 15, can be adjusted by rotating spindle 30 by turning knurled knob 36 at the upper end thereof.

In this way, the amount of water input to the reservoir can be fixed at a predetermined rate. This rate can be established by experimentation to provide for sufficient water input to maintain the capillary action of the system, while still limiting the input to a value less than full flow, to conserve water in the source.

If it is desired, the containers may be eliminated and a mound of soil may be placed on film 11. As shown in FIG. 2 and 5, plants may be located in the mound of soil and each plant will absorb as much water through the soil from film 11 as it requires to satisfy its needs while discharging its waste products through the soil through film 11 to be transmitted to the drain mechanism. Thus the versatility of the present invention is readily apparent.

In the diagram of the invention as shown in FIG. 6 planter 100 includes an upper tray A and a lower tray B with a sand glazed film 103 located on upper tray A and plastic strips thereacross as described in connection with FIG. 1. An enclosed water reservoir 101 having a discharge spout 104 that projects irrigation to the system with slot 104 monitoring the amount of water that is directed onto film 103. A drain mechanism 107 communicates with film 103 to the top of tray B which is a tray with a sand film and which due to its large enclosed area allows the water on the sand film to be evaporated so that water will be drawn through drain mechanism 107, which comprises a hollow cylinder, along film 103 from reservoir 101. A drain mechanism 102 is provided for reservoir 101 and may be folded between trays A and B as is shown in FIG. 7.

The operation of the planter of FIG. 6 is identical to that shown in FIG. 1 with regard to the feed of the plants along film 103 and may be adequately understood by referring to the portion of the description describing the operation of the planter.

It is noted that the embodiments of the plant irrigation system are successfully laboratory tested for cmmercial greenhouse application and practice.

What is claimed is:

1. A planter irrigation system for a plurality of plants that allows each plant to absorb as much water as it requires for optimum growth and for removing the waste products of each plant from the vicinity of the plant comprising:

a. a tray
b. a water reservoir
c. a water transmitting material located on said tray and covering a substantial portion of said tray, said water transmitting material covering an area sufficient so that a plurality of plants can be located thereon, said water reservoir being in fluid communication with said water transmitting material,
d. drain means in communication with said water transmitting material at a point lower than said reservoir to continuously permit drainage of water therefrom, by gravity, said drain means including at least one drain mechanism, said drain mechanism including a drain conduit in fluid communication with said water transmitting material, and a drain cap having a slitted periphery, said drain conduit and drain cap being filled with sand and said drain conduit being in communication with the sand in said drain cap, said drain means permitting water to continuously drain from the reservoir whereby plants that are located on said water transmitting material will be able to absorb water while the soluble waste products of each plant are removed from the vicinity of the plant by the water continuously from the vicinity of the plant by way of the water transmitting material.

2. A planter irrigation system for a plurality of plants for providing water to each plant and removing waste products of each plant from the vicinity thereof, said system comprising:

a. a tray
b. a water reservoir capable of receiving and holding water delivered thereto from an external water source said reservoir having a water adding means connectable to said external water source,
c. a portion of water transmitting agent across which water is laterally transmissable by capillary action, said agent being located upon said tray and covering a substantial portion of the area of said tray, said covered area being sufficient to accommodate a plurality of plants located thereon, said water transmtting agent having a portion thereof in fluid communication with water in said reservoir, said fluid communication of said water and said water transmitting agent enabling the lateral transmission of water by capillary action from said reservoir to substantially the entire area of said portion of said water transmitting agent, and
d. drain means in communication with said water transmitting agent for continuously permitting water to drain from said water transmitting agent in only the region of said drain means for establishing a continuous lateral flow of water from said reservoir across said water transmitting agent to said region of said drain means, said drain means comprising at least one drain mechanism, said drain mechanism including a drain conduit in fluid communication with said water transmitting agent, a drain cap having a slitted periphery, said drain conduit and drain cap being filled with sand and said drain conduit being in communication with the sand in said drain cap, whereby plants which are located in fluid communication with said water transmitting agent may draw water from said agent, in an amount determinable by the plants, and soluble waste products of the plants may pass from the region of the plants onto said water transmitting agent, said waste products being then carried by said continuous flow of water to said drain means.

3. The planter irrigation system of claim 2, further comprising a plurality of plant containers for holding plants to be grown by said system in a quantity of soil, said containers being positionable upon said water transmitting agent, said containers each comprising:
   a. a vessel having side walls and a bottom and having an opening in the region of said bottom, and
   b. a layer of glazed material for use as a further water transmitting agent and having a first side having particulate material adhering thereto, said layer being positioned adjacent one of said side walls with said first side facing inwardly in said vessel and extending into said opening.

4. A planter irrigation system for a plurality of plants for providing water to each plant and removing waste products of each plant from the vicinity thereof, said system comprising:
   a. a tray
   b. a water reservoir capable of receiving and holding water delivered thereto from an external water source said reservoir having a water adding means connectable to said external water source said water adding means comprising:
      i. conduit means connecting said source to said water reservoir to transmit water from said source to said reservoir,
      ii. an adjustable float valve means having an arm and being interposed in said conduit means to control the flow rate of water to said reservoir, and
      iii. means for maintaining said valve means in constant state of adjustment, comprising a spindle vertically and rotatably anchored to the bottom of said reservoir, having threads along a portion of its length and a knurled knob at its upper end, and a spring clamp adapted to be screwed onto said threads and to simultaneously engage and hold said arm of said float valve at a constant level,
   c. a portion of water transmitting agent across which water is laterally transmissable by capillary action, said agent being located upon said tray and covering a substantial portion of the area of said tray, said covered area being sufficient to accommodate a plurality of plants located thereon, said water transmitting agent having a portion thereof in fluid communication with water in said reservoir, said fluid communication of said water and said water transmitting agent enabling the lateral transmission of water by capillary action from said reservoir to substantially the entire area of said portion of said water transmitting agent, and
   d. drain means in communication with said water transmitting agent for continuously permitting water to drain from said water transmitting agent in only the region of said drain means for establishing a continuous lateral flow of water from said reservoir across said water transmitting agent to said region of said drain means,
   whereby plants which are located in fluid communication with said water transmitting agent may draw water from said agent, in an amount determinable by the plants, and soluble waste products of the plants may pass from the region of the plants onto said water transmitting agent, said waste products being then carried by said continuous flow of water to said drain means.

* * * * *

UNITED STATES PATENT OFFICE
CERTIFICATE OF CORRECTION

Patent No. 3,778,928    Dated Dec. 18, 1973

Inventor(s) Evert S. Green

It is certified that error appears in the above-identified patent and that said Letters Patent are hereby corrected as shown below:

Col. 6, line 31, delete "cmmercial" and substitute --commercial--.

Col. 6, line 62, before "from" insert --exiting--.

Signed and sealed this 23rd day of July 1974.

(SEAL)
Attest:

McCOY M. GIBSON, JR.
Attesting Officer

C. MARSHALL DANN
Commissioner of Patents